Patented Oct. 13, 1942

2,298,405

UNITED STATES PATENT OFFICE 2,298,405

CYCLOALKANYL PEROXIDE AND PROCESS OF PRODUCING THE SAME

Nicholas A. Milas, Belmont, Mass., assignor to Research Corporation, New York, N. Y., a corporation of New York No Drawing. Application September 7, 1939, Serial No. 293,851

11 Claims. (Cl. 260—610)

This invention relates to the synthesis of peroxidic derivatives of cycloalkanes and with the products of such synthesis. By the term "peroxidic derivatives of cycloalkanes" is here meant an organic peroxide derived from a cycloalkanone, i. e., a cycloalkanyl ketone by interaction of hydrogen peroxide with the latter, with or without removal of $H_2O$ from the resulting reaction product.

I have found that when cycloalkanones are reacted with anhydrous hydrogen peroxide, at least three types of peroxides are likely to form, and cycloalkanylidene peroxides (III, IV, V, and VI).

Using a circle to denote a cycloparaffinic ring of at least 3 carbon atoms, and the symbol

to denote a cycloalkanone, the various peroxidic products formed by the reaction just stated may be illustrated as follows:

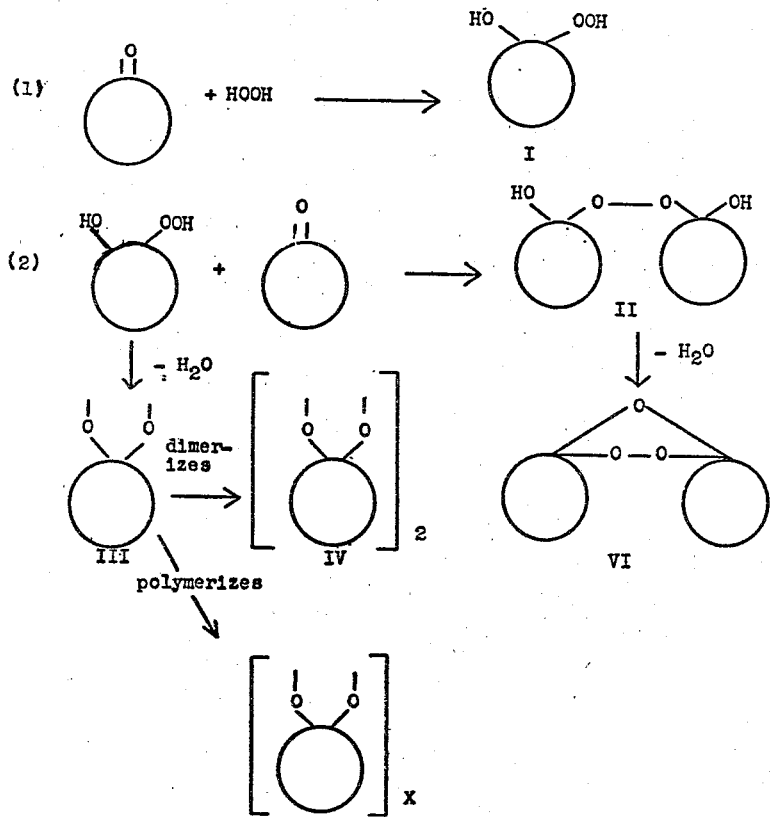

iz., 1-hydroxycycloalkanyl hydroperoxide-1 (I), .1'-dihydroxydicycloalkanyl peroxide-1.1' (II), Using the cyclopentyl radical as the cycloparaffinic radical of such ketones, these various peroxidic products may be illustrated as follows:

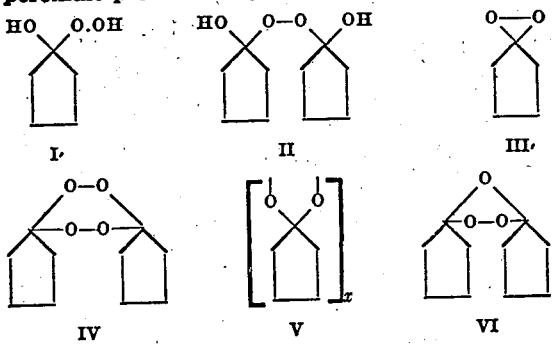

In certain cases, especially with cyclopentanone as the ketone, products of type I above spontaneously revert to types III, IV or V,—whereas in other cases this reaction as well as that from type II to type VI requires use of a suitable dehydrating agent.

The cycloalkanyl peroxides of the present invention are useful as organic sources of active oxygen. In view of their ease of preparation from fairly cheap sources of raw materials and their relative stability, these peroxides may be used as germicides; as bleaching agents, e. g., for the bleaching of various types of cloth and, being relatively non-toxic, for the bleaching of flour; as accelerators for the polymerization of various unsaturated substances to produce valuable resins; as accelerators for the combustion of Diesel fuels; as explosives in blasting; and in other relations.

The invention will now be described with greater particularity with reference to the following illustrative (but not exclusive) examples:

EXAMPLE 1.—*1-hydroxycyclopentyl hydroperoxide-1*

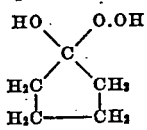

The cyclopentanone used was purified by fractionation and the fraction boiling at 129–130° C. collected. Five grams of this product was dissolved in 100 cc. of 0.6 molal hydrogen peroxide in anhydrous ether and the solution allowed to stand at room temperature for a few days. The ether was then removed at room temperature under reduced pressure and the viscous residue subjected to a vacuum of about 1 mm. for several hours to remove any unconverted ketone and free hydrogen peroxide. The viscous residue, 6.2 g., was analyzed for active oxygen using an acetone solution of sodium iodide acidified with acetic acid and titrating the liberated iodine against standard sodium thiosulfate.

Anal. calcd. for $C_5H_{10}O_3$: Active (O): 13.6. Found: Active (O): 13.9, 14.4.

The above experiment was repeated a number of times using both ether and t-butyl alcohol as solvents, with practically identical results.

It should be noted here that the above peroxidic product is highly explosive.

EXAMPLE 2.—*1,1'-dihydroxydicyclopentyl peroxide-1,1'*

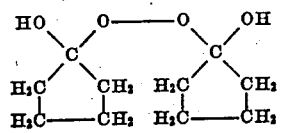

Five grams of purified cyclopentanone was dissolved in 50 cc. of 0.6 molal hydrogen peroxide in anhydrous ether, and, after a few days of standing at room temperature, the ether was removed under reduced pressure and the viscous residue subjected to a vacuum of about 1 mm. for a few hours to remove all volatile products. The residue, 5.5 g., was analyzed for active oxygen.

Anal. calcd. for $C_{10}H_{18}O_4$: Active (O), 7.92. Found: Active(O) 8.12, 7.84.

EXAMPLE 3.—*Dicyclopentylidene peroxide*

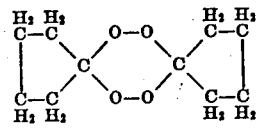

When 1-hydroxycyclopentyl hydroperoxide-1 was allowed to stand at room temperature for several days crystals (needles) began to form. These were separated and dried on a porous plate. Cooling the viscous residue to 0° C. for some time enhanced crystallization. These crystals melted rather sharply at 73–75° C. and the melt began to show evolution of gas at 105° C. They exploded violently when heated on a steel spatula.

Anal. calcd. for $C_5H_{10}O_3.\frac{1}{2}H_2O_2$: Active (O), 17.8. Found: Active (O), 18.7, 18.6, 18.64.

This peroxide has also been prepared by allowing cyclopentanone (1 cc.) to react with 30% hydrogen peroxide, "Albone C," (1 cc.) for 2 days, then cooling the clear solution in an ice-salt mixture whereby a white crystalline solid separated out. This solid was dried on a porous plate and found to have a M. P. of 73–75° C. and an analysis of 18.6% active oxygen.

In view of these results, I have come to the conclusion that this peroxide is probably 1-hydroxycyclopentyl hydroperoxide-1 with half a mole of hydrogen peroxide of crystallization. Because of its explosiveness I was unable to run combustions for carbon and hydrogen determinations. This also has been the case with all other peroxides obtained from cyclopentanone.

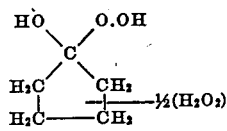

Whenever the peroxide, M. P. 73–75° C., was recrystallized from ether or from a 50–50 mixture of ether and petroleum ether, a new crystalline (needles) peroxide was obtained, M. P. 160° C. with effervescence. This peroxide is soluble in a number of organic solvents including ether, alcohol, acetone, dioxane, etc. It liberates iodine instantly from a sodium iodide solution in acetone acidified with acetic acid.

Anal. calcd. for $C_5H_8O_2$: Active (O) 16.0. Found: Active (O), 16.13, 15.6, 16.5.

Inasmuch as the M. P. of this peroxide is too high for a five carbon substance, it was early suspected that it might be a polymer of cyclopentylidene peroxide. A molecular weight was therefore taken in t-butyl alcohol and in camphor and found to be 206 and 202 respectively as against 200 calculated for the dimer of cyclopentylidene peroxide.

EXAMPLE 4.—*Polycyclopentyliene peroxide*

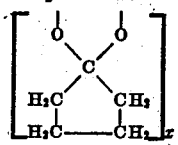

When 1,1'-dihydroxy dicyclopentylidene peroxide-1,1' was allowed to stand at room temperature for several days a solid crystalline peroxide separated out which melted at 166° C. with effervescence. A mixed M. P. with dicyclopentylidene peroxide showed no depression. However, unlike the latter peroxide this product was completely insoluble in ether, alcohol, acetone and other common organic solvents, and, in view of this property, failed to liberate iodine from an acidified acetone-sodium iodide solution even after five days of standing at room temperature. Dioxane was the only suitable solvent from which it was recrystallized several times with no change in M. P. An atempt to determine its molecular weight was unsuccessful. When analyzed for active oxygen in an acidified solution of sodium iodide in dioxane the results obtained were highly unsatisfactory. Finally, when it was refluxed in an acetone-acetic acid-sodium iodide solution for one hour, using appropriate blanks, it yielded only about three-fourths of its active oxygen.

Anal. calcd. for $(C_5H_8O_2)_x$: Active (O) 16.0. Found: Active (O), 12.6.

Although this peroxide is very inert, it explodes violently when heated on a steel spatula.

A yield of over 50% was obtained as polycyclopentylidene peroxide from the original reaction product.

This same polymer was also obtained in smaller quantities together with the dimer when the peroxide M. P. 73–75° C. was treated with various solvents.

EXAMPLE 5.—*1-hydroxycyclohexyl hydroperoxide-1*

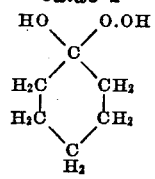

Five grams of cyclohexanone (B. P. 155–156° C.) was mixed with 85 cc. of 0.6 molal hydrogen peroxide solution in anhydrous ether and the mixture allowed to stand at room temperature for one day. The ether was then removed under reduced pressure and the viscous residue allowed to stand at room temperature whereby it crystallized out after one day. The crystals were dried on a porous plate; yield, 3.8 g.; M. P. 76–78° C. which did not change appreciably after recrystallization from ether.

Anal. calcd. for $C_6H_{12}O_3$: Active (O), 12.13. Found: Active (O), 12.94, 12.96.

This peroxide is rather stable and explodes only mildly when heated on a steel spatula.

EXAMPLE 6.—*1,1'-dihydroxydicyclohexyl peroxide-1,1'*

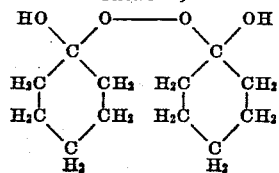

Eight and eight-tenths grams of cyclohexanone was mixed with 87 cc. of 0.55 molal hydrogen peroxide solution in anhydrous ether and the mixture allowed to stand at room temperature for two days. The ether was then removed under reduced pressure and the highly viscous residue was allowed to stand at 0° C. for twenty-four hours whereby it was converted into a white crystalline mass which was recrystallized from ether; M. P. 68–70° C. A yield of 4.1 g. of the pure product was obtained. This peroxide is insoluble in water and fails to liberate iodine from an acidified solution of potassium iodide. It was therefore analyzed by the acetone method above described.

Anal. calcd. for $C_{12}H_{22}O_4$: Active (O), 6.96. Found: Active (O), 6.89.

When heated on a steel spatula this peroxide does not explode but burns with a smoky flame.

EXAMPLE 7.—*Hydroxy-methyl-cyclohexyl hydroperoxides and peroxides*

Seven peroxides were obtained from the three methyl-cyclohexanones. For the hydroperoxides equimolecular proportions of the ketones and 0.6 molal hydrogen peroxide in anhydrous ether were mixed together and the mixtures allowed to stand at room temperature for some time. For the peroxides the molal ratio used of the ketone to peroxide was 2:1. After a number of days, in all cases the ether was removed under reduced pressure and the products obtained separated and analyzed. All peroxides thus obtained with the exception of those obtained from m-methyl-cyclohexanone were highly viscous liquids but failed to crystallize even when cooled to —20° C. The viscosity of the peroxides from m-methyl-cyclohexanone was rather low and only increased slightly when cooled to —20° C. Analytical and other data of these peroxides are given in Table I following:

*Table I*

SUMMARY OF DATA FOR THE HYDROXY METHYL HYDROPEROXIDES AND PEROXIDES

| Peroxide | Formula | Yield in per cent | Active (O) calcd. | Active (O) calcd. |
|---|---|---|---|---|
| 1-hydroxy-3-methyl-cyclohexyl hydroperoxide-1 | $C_7H_{14}O_3$ | 89 | 10.95 | { 10.25<br>{ 10.27 |
| 1-hydroxy-2-methyl-cyclohexyl hydroperoxide-1 | $C_7H_{14}O_3$ | 90 | 10.95 | 10.50 |
| 1-hydroxy-4-methyl-cyclohexyl hydroperoxide-1 | $C_7H_{14}O_3$ | 86 | 10.95 | { 11.48<br>{ 11.30 |
| 1,1'-dihydroxy-3,3'-dimethyl-dicyclohexyl peroxide-1,1' | $C_{14}H_{28}O_4$ | 98 | 6.21 | 6.21 |
| 1,1'-dihydroxy-2,2'-dimethyl-dicyclohexyl peroxide-1,1' | $C_{14}H_{28}O_4$ | 89 | 6.21 | 6.13 |
| 1,1'-dihydroxy-4,4'-dimethyl-dicyclohexyl peroxide-1,1' | $C_{14}H_{28}O_4$ | 89 | 6.21 | 6.07 |

When 1-hydroxy-3-methylcyclohexyl hydroperoxide-1

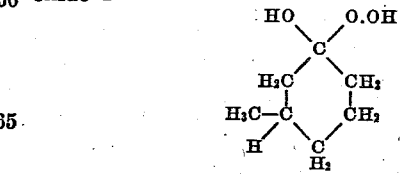

was allowed to stand at room temperature for a number of days, crystals began to separate which, after several recrystallizations from anhydrous ether melted rather sharply at 120–121° C.

Anal. calcd. for $C_7H_{12}O_2 \cdot \tfrac{1}{2}H_2O_2$: Active (O) 16.5. Found: Active (O), 16.0.

This peroxide is highly explosive when heated on a steel spatula and behaves in all respects like the cyclopentylidene peroxide with hydrogen peroxide of crystallization. However, after several crystallizations I was unable to obtain cyclo 3-methyl cyclohexylidene peroxide free from hydrogen peroxide.

EXAMPLE 8.—*1-hydroxycycloheptyl hydroperoxide-1*

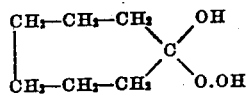

Five grams of cycloheptanone was mixed with 100 cc. of 0.55 molal hyrdogen peroxide in anhydrous ether and the mixture was allowed to stand at room temperature for several days. When the ether was removed under reduced pressure, the highly viscous residue (4.5 g.) partly crystallized out, and the crystals separated and dried on a porous plate; M. P. 92–94° C.

Anal. calcd. for $C_7H_{14}O_3$: Active (O), 10.95. Found: Active (O), 10.00.

EXAMPLE 9.—*1-hydroxycyclooctyl hydroperoxide-1*

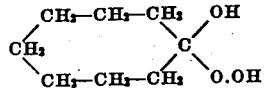

Four and four-tenths grams of cyclooctanone was mixed with 120 cc. of 0.55 molal solution of hydrogen peroxide in anhydrous ether and the mixture allowed to stand at room temperature for several days. To remove the excess hydrogen peroxide, the mixture was then shaken several times with a saturated ammonium sulfate solution until the aqueous layer gave a negative test for hydrogen peroxide. The ether layer was then dried with anhydrous magnesium sulfate, filtered, and the ether removed under reduced pressure. A highly viscous semi-solid product, 4.4 g., was obtained which became curdy on standing for several weeks at room temperature, but failed to crystallize even when cooled to −78° C.

Anal. calcd. for $C_8H_{16}O_3$: Active (O), 10.00. Found: Active (O), 9.65.

EXAMPLE 10.—*1,1'-dihydroxydicyclooctyl peroxide-1,1'*

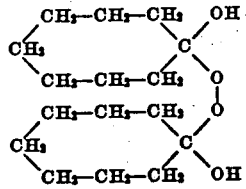

This peroxide was prepared in the same manner as the mono-cyclooctyl except that the proportions of reagents used were different. Two and six-tenths grams (0.0206 mole) of cyclooctanone was mixed with 22 cc. of 0.55 molal hydrogen peroxide in anhydrous ether and the mixture allowed to stand at room temperature for several days. The solution was then shaken several times with a saturated solution of ammonium sulfate until the latter showed negative test for hydrogen peroxide. Finally, the ethereal solution was dried with anhydrous magnesium sulfate, filtered and the ether removed under reduced pressure. A yield of 2.2 g. of highly viscous product was obtained which failed to crystallize.

Anal. calcd. for $C_{16}H_{30}O_4$: Active (O), 5.59. Found: Active (O), 5.53.

I claim:
1. A cycloalkanyl peroxide.
2. A 1-hydroxycycloalkanyl hydroperoxide-1.
3. A 1,1'-dihydroxydicycloalkanyl peroxide-1,1'.
4. An hydroxycyclopentyl peroxide.
5. 1,1'-dihydroxydicyclopentyl peroxide-1,1'.
6. A 1-hydroxy-methyl-cyclohexyl hydroperoxide -1.
7. 1 - hydroxy-3-methyl-cyclohexyl hydroperoxide-1.
8. Process for the production of a cycloalkanyl peroxide which comprises reacting a cycloalkanyl ketone with hydrogen peroxide in the absence of water.
9. Process for the production of a cycloalkanyl peroxide which comprises reacting a cycloalkanyl ketone with hydrogen peroxide dissolved in a non-aqueous volatile organic solvent, and separating the solvent from the resulting product.
10. Process for the production of a 1-hydroxycycloalkanyl hydroperoxide-1, which comprises reacting a cycloalkanyl ketone and anhydrous hydrogen peroxide in substantially equimolecular proportions.
11. Process for the production of a 1,1'-dihydroxydicycloalkanyl peroxide-1,1', which comprises reacting a cycloalkanyl ketone and anhydrous hydrogen peroxide in substantially the molal ratio of the cyclic ketone to the hydrogen peroxide of 2:1.

NICHOLAS A. MILAS.